Patented Sept. 5, 1933

1,925,802

UNITED STATES PATENT OFFICE 1,925,802

PROCESS FOR MAKING DIETHYL ANILINES

Roy Lyman Heindel, Jr., Midland, Mich., assignor to The Dow Chemical Company, Midland, Mich., a corporation of Michigan No Drawing. Application August 4, 1930
Serial No. 473,131

9 Claims. (Cl. 260—128)

The present invention is concerned with processes for making alkylated aromatic amines, and more particularly to an improved process for preparing diethyl aniline.

At the present time a well known process for making diethyl aniline consists in refluxing in two or more steps a mixture of aniline with an excess of ethyl bromide, and subsequently treating with caustic soda solution to decompose the hydrobromides of the ethyl anilines thus formed and to liberate the free anilines. The resulting reaction mixture separates into an oily layer and aqueous layer. The oily layer thus produced consists of a mixture of diethyl aniline with a considerable proportion of the monoethyl compound and unreacted aniline, as well as excess ethyl bromide, even after two repetitions of the above steps. The time required for carrying out each step of this process appears to vary widely, i. e. from 10 to 20 hours being reported by different writers. The separation of the oily layer into its various constituents requires very careful manipulation and is expensive and slow to accomplish. It is desirable to obtain a diethyl aniline product substantially free from both aniline and monoethyl aniline, as the latter two compounds are troublesome and costly to separate from the former.

Among the objects of my invention is, accordingly, to provide a process for making alkylated aromatic amines and more especially diethyl aniline by which process an increased yield of the dialkyl derivative may be obtained, meanwhile allowing a substantially reduced reaction time and, if desired, permitting the use of a less expensive ethylating agent, i. e. ethyl chloride, than the ethyl bromide usually employed. Another object is to simplify the carrying out of such a process; that is, to accomplish the principal reaction substantially in a single step. Other objects and advantages will be set forth as the description proceeds. To the accomplishment of the foregoing and related ends, the invention, then, consists of the method hereinafter fully described and particularly pointed out in the claims, the following description setting forth in detail several modes of carrying out the invention, such disclosed modes illustrating, however, but several of various ways in which the principle of the invention may be used.

When ethyl bromide is employed as the ethylating agent in carrying out my improved process, the reaction may be accomplished in a single step. A mixture of aniline, ethyl bromide and lime, the last two in slightly greater proportion than that theoretically required to react with aniline to form diethyl aniline, is introduced into a suitable reaction vessel which is equipped for agitation and capable of withstanding internal pressure. The closed reactor is heated to a temperature between 200° and 240° C., whereupon the vapor pressure of the reaction mixture may increase to as high as 300 pounds gauge. The exact pressure obtained in a given instance will, of course, be dependent somewhat upon the size of the reactor and relative volume of the reaction charge employed. As the ethylation of the aniline proceeds, the temperature gradually drops to between 185° and 195° C. and the pressure to around 65 pounds. Rarely is more than one hour required to complete this operation. The pressure on the reaction vessel is now released by venting into a suitable water cooled condenser connected thereto. A vacuum corresponding to an absolute pressure of 75 mm. mercury gauge is then applied to the condenser to complete the removal of unreacted ethyl bromide from the reaction product, along with some water, and the ethyl bromide thus removed and condensed is reutilized in another operation. The oily aniline reaction product separated from the semi-solid residue of calcium bromide and hydroxide consists of about 95 to 98 per cent or more diethyl aniline. The calcium bromide-lime residue usually contains appreciable amounts of the aniline reaction product and is transferred to a storage vessel where it is treated with hot water, the calcium bromide going into solution, and the oily aniline reaction products separating out therefrom as a distinct layer. The oil layer is removed and added to the main body of diethyl aniline product. The insoluble lime is filtered from the calcium bromide solution and the latter is transferred to a storage vessel and may be reworked. The diethyl aniline thus obtained is entirely free from aniline and monoethyl aniline and after distillation represents a yield of 93 to 95 per cent of theory of distilled product having a purity varying from 98 to 99½ per cent.

In using ethyl chloride as an ethylating agent, however, I preferably carry out my process in two steps. In the first step a mixture of aniline, ethyl chloride, and lime, the latter two materials in slight excess over theoretical proportions for producing diethyl aniline, is charged into a reaction vessel such as that employed above, and heat applied. At a temperature between 210° and 220° C. and a vapor pressure around 450 pounds gauge, the ethylation of the aniline begins, and continues until the temperature gradually drops to between 170° and 190° C., and the pressure in the neighborhood of 150 pounds, at which point the reaction is substantially complete. The pressure on the reaction vessel, which is due in most part to the vapor pressure of unreacted ethyl chloride, is released into a suitable condenser attached thereto which is cooled by brine or otherwise so as to maintain a temperature of 0° C. or below and by which the excess ethyl chloride is condensed. Further separation of the reaction products is accomplished as previously described. In this instance, however, the oily aniline layer consists of 93 to 98 per cent diethyl aniline and the remainder largely monoethyl aniline; and if diethyl aniline of only approximate purity is desired, it may be obtained in the foregoing single step.

The oily aniline layer obtained in the above operation is mixed with an excess of ethyl bromide and lime over that amount necessary to convert the monoethyl aniline content thereof to diethyl aniline, and the mixture may be charged into the reaction vessel used in the above step or into any other suitable vessel and heated to a temperature around 180° C. and under pressure for about 2 hours, during which time the monoethyl aniline is practically entirely converted to diethyl aniline, which may be separated as described in the first step. Instead of using lime directly in this step, the oily layer may be reacted with ethyl bromide alone, although less desirably, and the resulting product treated with lime or a caustic soda solution to decompose the hydrobromide salt and liberate the free base. The diethyl aniline thus obtained distills over between 213° and 216½° C., corrected to 760 mm. pressure, and by one distilling operation under vacuum a practically water white product will result. Yields varying from 89 to 94 per cent of purified product on aniline used have been obtained when ethyl chloride was used as an alkylating agent.

It is noted in the following equations which are illustrative of the reactions taking place in the first step of the second mode of ethylation in the foregoing:

(1) 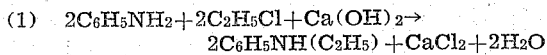
$2C_6H_5NH_2 + 2C_2H_5Cl + Ca(OH)_2 \rightarrow 2C_6H_5NH(C_2H_5) + CaCl_2 + 2H_2O$ (2) 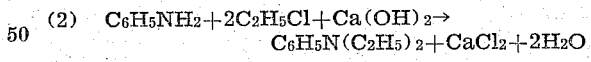
$C_6H_5NH_2 + 2C_2H_5Cl + Ca(OH)_2 \rightarrow C_6H_5N(C_2H_5)_2 + CaCl_2 + 2H_2O$ that when a slight excess of ethyl chloride is present the monoethyl derivative of equation 1 largely goes to the diethyl derivative as in equation 2. A practically complete transformation of the aniline is thereby had. By use of a greater excess of ethyl chloride, or of a mixture of ethyl chloride and lime, no appreciably increased conversion of the monoethyl aniline to the diethyl aniline was thereby obtained. Temperatures of reaction in excess of those stated above have been found not to increase the yield of diethyl aniline materially over that stated hereinbefore. The lime as used in carrying out my process may contain varying amounts of the oxide, hydroxide or carbonate of calcium, in addition to impurities. Instead of lime, barium oxide or hydroxide may be used. Alkali bases such as NaOH, KOH and Na₂CO₃ may be used in place of the bases of the alkaline earth metals as described above; however, the latter are preferable to use because of a better yield of diethyl aniline obtained thereby and more satisfactory operating conditions possible when so employed in my process. The following are given as specific examples for the preparation of diethyl aniline as carried out by my process.

Example 1

A reaction charge consisting of 4 moles (372 grams) aniline, 9 moles (980 grams) ethyl bromide, and 5.4 moles (400 grams) lime was introduced into an iron pressure reaction vessel and heat applied until a temperature of 240° C. and a pressure of 280 to 300 pounds was reached. Upon discontinuing the external heating of the reaction vessel the temperature therein held between 185° and 200° C., while the pressure rapidly fell to between 50 and 65 pounds gauge. In about 20 minutes the reaction was complete and the products of reaction removed from the reaction vessel and the oily layer consisting of practically entirely aniline products was separated and purified by redistilling. A yield of approximately 94 per cent diethyl aniline of boiling point 214° to 216½° C. at 760 mm. pressure was obtained. No free aniline remained after the reaction, and tests for monoethyl aniline by the "R-salt method" showed the entire absence thereof.

Example 2

A mixture of 4 moles (372 grams) aniline, 9.3 moles (590 grams) ethyl chloride, and 4 moles (300 grams) lime was charged into an autoclave of such size that the volume of the charge was about 40 per cent. of that of the capacity of the reaction vessel. Agitation was begun and heat applied to the reaction batch until a temperature of between 210° and 220° C. and a pressure of around 450 pound gauge on the reaction vessel was obtained. With further heating the pressure began to recede as soon as the ethyl chloride entered into the reaction and continued to an apparent state of equilibrium between 185° and 190° C., and a gauge vapor pressure of 130 to 150 pounds. Tests showed the ethylation to be practically complete in 3 hours, and the final pressure to be largely due to that of unreacted ethyl chloride. A condenser was connected to the reaction vessel, the pressure released therethrough, and a vacuum around 75 mm. mercury gauge applied to the condenser. After distilling off the ethyl chloride, the oily ethyl aniline reaction mixture was separated by further distillation, leaving a residue consisting most of calcium chloride and unreacted lime in the reaction vessel. A mixture of 97.2 per cent diethyl aniline and 2.8 per cent monoethyl aniline was obtained.

The above mixture of monoethyl and diethyl aniline was now reintroduced into the reaction vessel, used in the first step after first removing the lime residue therefrom, together with about ½ the weight of said mixture of ethyl bromide and about ¼ said weight of lime, both the ethyl bromide and the lime being in considerable excess over that theoretically required to convert the monoethyl aniline to diethyl aniline. Heat was applied to the reaction vessel until a temperature of approximately 180° C. and a gauge pressure of 55 pounds was reached. After maintaining the above temperature for about 1 hour during which time the pressure diminished somewhat and then remained constant, the reaction vessel was then attached to the condenser, the pressure released therethrough, and vacuum applied and the several products of reaction separated as in the first step. The monoethyl aniline was found to have been completely changed to diethyl aniline. The residue in the reaction vessel, which consists of a mixture of calcium bromide and unreacted lime and a small amount of diethyl aniline, was now treated with hot water to separate the diethyl aniline, which separated as an oily layer and was removed. The remaining solution and residue which is small in amount was discarded. A yield of redistilled diethyl aniline of 89.2 per cent of that theoretically possible, when calculated on the aniline used, with a boiling point between 213° and 216° C. (corrected to 760 mm. pressure) was obtained.

To ascertain the presence and quantity of monoethyl aniline present in the products of reaction, the "R-salt method" (J. Am. Chem. Soc. 46, 1837, (1924)), was employed. When ethyl bromide in the presence of lime was used as an alkylating agent the entire absence of monoethyl aniline was evident in the products of reaction from the first step, while with ethyl chloride and lime as alkylating means the second step was necessary to completely convert the monoethyl to the diethyl derivative. Tests for monoethyl aniline by the well known acetic anhydride method (Cain and Thorpe, "The Synthetic Dyestuffs and Intermediate Products", page 309) showed all the aniline to have been reacted in the first step of the process.

In carrying out my improved process for making diethyl aniline, contrary to the usual results obtained in reacting compounds of this type, no tars or tarry materials were obtained when either ethyl bromide or ethyl chloride were employed as alkylating agents. Temperatures below 170° C. for carrying out the first step of my process appear to favor the formation of monoethyl aniline. The optimum temperature when using ethyl chloride as an alkylating agent, i. e. that at which a maximum yield of both monoethyl and diethyl aniline at the point at which the greatest predominance of the latter is obtained, appears to lie between approximately 180° and 240° C.

Although in my improved process for making diethyl aniline, it is manifestly advantageous to use ethyl chloride because of its relatively low cost, yet the use of ethyl bromide may at times be preferred because of the relativly short reaction time required and the complete ethylation thereby of the aniline to diethyl aniline in a single step. It is to be especially observed in the latter case that the reaction time, i. e. 10 to 20 hours, necessary in the processes heretofore in general use, as previously described, is decreased to an hour or less. The use of ethyl bromide as the alkylation agent is further favored on account of the presence of a small amount of monoethyl derivative in the product when such chloride is used, which necessitates an additional step using some of the bromide to complete the conversion of the monoethyl to the diethyl derivative. However, to make the use of ethyl bromide commercially practicable, the calcium bromide by-product from the ethylation of the aniline therewith must be saved and reworked, thereby requiring an additional operation and equipment. When ethyl chloride is used, obviously the by-product formed thereby, which is largely calcium chloride, may be thrown away without appreciable loss. It is also noted that in using lime in place of caustic soda that the tendency to hydrolysis of the alkylating agents, ethyl bromide and ethyl chloride, is thereby much reduced. By use of my improved process, therefore, not only may the usual ethylating agent, ethyl bromide, be used much more effectively in making diethyl aniline, but ethyl chloride a cheaper and well adapted ethylating material is also made available.

It will be understood that my improved process, as specifically set forth in the manufacture of diethyl aniline, is not limited thereto, but is applicable as well to reacting toluidine or aromatic amines generally with an alkyl halide, e. g. ethyl bromide or chloride, to obtain the corresponding dialkylated aromatic amine. The conditions of reaction also may vary somewhat depending upon the reacting materials employed. Although lime is preferable to use in carrying out my process, other similar alkali earth metal compounds such as barium hydroxide etc., may be substituted therefor, as a whole or in part.

Other modes of applying the principle of my invention may be employed instead of the one explained, change being made as regards the process herein disclosed, provided the means stated by any of the following claims or the equivalent of such stated means be employed.

I therefore particularly point out and distinctly claim as my invention:—

1. A process for making diethyl aniline, which comprises heating aniline, under superatmospheric pressure and at a temperature between 170° and 240° C., with at least twice its molecular equivalent of an ethyl halide and at least its molecular equivalent of an alkaline earth metal base.

2. A process for making diethyl aniline, which comprises heating a mixture of aniline with at least twice its molecular equivalent of ethyl chloride and at least its molecular equivalent of lime to a temperature between 170° and 240° C. under superatmospheric pressure.

3. In a process for making diethyl aniline, the steps which consist in heating a mixture of aniline with at least twice its molecular equivalent of ethyl chloride and with at least its molecular equivalent of lime to a temperature between 170° and 240° C. under superatmospheric pressure, cooling the reacted mixture and separating therefrom the oily layer, which consists largely of diethyl aniline together with some monoethyl aniline, mixing said oily layer with lime and ethyl bromide, in amounts representing, respectively, at least the molecular equivalent of the monoethyl aniline present, and heating the mixture to a temperature between 170° and 240° C. under superatmospheric pressure, and separating diethyl aniline from the reacted mixture.

4. In a process for making di-ethyl aniline, the steps which consist in heating, under superatmospheric pressure and at a temperature between 170° and 240° C., a mixture of aniline, with more than twice its molecular equivalent of ethyl chloride and more than its molecular equivalent of lime, boiling off the excess of ethyl chloride, separating the resulting reaction mixture into an oily layer consisting substantially of di-ethyl aniline, together with a small amount of monoethyl aniline and a salt solution layer of largely calcium chloride, extracting said salt solution layer with a water-immiscible organic solvent to remove therefrom the monoethyl aniline and the di-ethyl aniline contained therein, separating said substituted anilines from the extract and adding same to the above mentioned oily layer, reacting at a temperature between 170° and 240° C. and under superatmospheric pressure said oily layer with an excess of ethyl bromide and lime with respect to the conversion of the monoethyl aniline contained therein to di-ethyl aniline to produce substantially di-ethyl aniline and calcium bromide, distilling off the unreacted ethyl bromide, separating said di-ethyl aniline from said sodium bromide, redistilling the former, dissolving up the latter and removing therefrom the di-ethyl aniline contained therein, and separating said di-ethyl aniline.

5. A process for making aromatic ethyl amines, which comprises heating an aromatic amine of the benzene series, under superatmospheric pressure and at a temperature between 170° and 240° C., with slightly more than twice its molecular equivalent of an ethyl halide and slightly more than its molecular equivalent of an alkaline earth metal base.

6. A process for making aromatic ethyl amines, which comprises heating an aromatic amine of the benzene series, under superatmospheric pressure and at a temperature between 170° and 240° C., with slightly more than twice its molecular equivalent of an ethyl chloride and slightly more than its molecular equivalent of an alkaline earth metal base.

7. A process for making a di-ethyl aniline, which comprises heating aniline, under superatmospheric pressure and at a temperature between 170° and 240° C., with more than twice its molecular equivalent of an ethyl chloride and with an alkaline earth metal base.

8. A process for making di-ethyl aniline, which comprises heating, under superatmospheric pressure and at a temperature between 170° and 240° C., aniline with more than twice its molecular equivalent of an ethyl halide and with an alkaline earth metal base, said heating operation being conducted in one step only.

9. A process for making di-ethyl aniline, which comprises heating, under superatmospheric pressure and at a temperature between 170° and 240° C., aniline with more than twice its molecular equivalent of ethyl bromide and with lime, said heating operation being conducted in one step only.

ROY LYMAN HEINDEL, JR.